(12) United States Patent
Kellgren

(10) Patent No.: US 6,758,959 B2
(45) Date of Patent: Jul. 6, 2004

(54) METHOD AND APPARATUS FOR OXYGENATING GROUND WATER

(76) Inventor: Jerry Kellgren, 557 Plank Rd., Naperville, IL (US) 60563

( * ) Notice: Subject to any disclaimer, the term of this patent is extended or adjusted under 35 U.S.C. 154(b) by 175 days.

(21) Appl. No.: 10/074,488

(22) Filed: Feb. 12, 2002

(65) Prior Publication Data

US 2003/0155297 A1 Aug. 21, 2003

(51) Int. Cl.[7] .............................................. C02F 1/461
(52) U.S. Cl. ................... 205/701; 205/742; 205/756; 204/274; 204/275.1; 204/276; 204/278
(58) Field of Search .................... 205/701, 742, 205/756; 204/274, 275.1, 276, 278

(56) References Cited

U.S. PATENT DOCUMENTS

| | | |
|---|---|---|
| 5,095,975 A | 3/1992 | Bernhardt |
| 5,190,108 A | 3/1993 | Mansuy |
| 5,286,141 A | 2/1994 | Vigneri |
| 5,425,598 A | 6/1995 | Pennington |
| 5,614,078 A | 3/1997 | Lubin |
| 5,690,173 A | 11/1997 | Abdul |
| 5,874,001 A | 2/1999 | Carter |
| 5,904,851 A | 5/1999 | Taylor |
| 5,957,196 A | 9/1999 | Gibson |
| 6,083,377 A | 7/2000 | Lin |
| 6,102,623 A | 8/2000 | Suthersan |
| 6,110,353 A * | 8/2000 | Hough ................. 205/701 |
| 6,197,187 B1 | 3/2001 | Thornton |

FOREIGN PATENT DOCUMENTS

WO  WO 95/21795  *  8/1995

* cited by examiner

Primary Examiner—Arun S. Phasge
(74) Attorney, Agent, or Firm—Robert L. Marsh

(57) ABSTRACT

An oxygenation unit for insertion into a well is used to increase the oxygenation of ground water. The unit includes a length of tubing suspended in the well. Within the tubing are a plurality of parallel spaced plates. An electric potential is applied across adjacent plates such that electrolysis will break water down to oxygen and hydrogen. Water is circulated through the unit using an air flow draft pump in which air is bubbled up through an inverted funnel in the tube.

24 Claims, 9 Drawing Sheets

Oxygen (ppm) vs Distance (ft) from Well

METHOD AND APPARATUS FOR OXYGENATING GROUND WATER

The present invention relates to the removal of aerobic pollutants from the ground and, in particular, to a method and apparatus for removing such aerobic pollutants by oxygenating the ground water.

BACKGROUND OF THE INVENTION

Hydrocarbon spills, such as oil, gasoline and the like, are toxic wastes which damage the environment by permeating the ground into which they are spilled. The existence of hydrocarbon toxic wastes on a parcel of real estate can prevent the owner from obtaining building permits leading to development, lead to the shut down of existing activities carried out on the parcel and render the parcel unmarketable. One method of removing hydrocarbon pollutants from the ground is to encourage the growth of bacteria within the ground that feed on the toxic hydrocarbon molecules to convert them into non-toxic waste products. Another method is to oxygenate the ground to thereby encourage the oxygenation of the toxic hydrocarbon molecules to thereby convert them into non-toxic molecules.

Soil contamination typically arises from leakage from oil and fuel tanks, and the associated piping and the process of filling and emptying such tanks. Hydrocarbons contaminate unsaturated soil by the forces of gravity and the movement of surface water which cause the contaminants to spread over an area much greater than occupied by the tanks alone. Over time, the petroleum products will leach into the underlying ground, spreading horizontally and downward through the pores in the soil. Upon reaching the ground water, the petroleum will pool and move with the ground water to contaminate adjacent ground.

The primary pollutants from gasoline and the like are benzene, toleune, ethylbenzene, xylene (BTEX) and methyl-tertiary-butyl-ether (MTBE).

A number of methods are currently available for reclaiming polluted ground. One method is to remove the contaminated soil to a secure site. Another is to treat the ground with physical, chemical or biological means. A third is to withdraw existing ground water and treat the water with chemicals or biological organisms and return the water to the ground. Generally, in-situ treatment of the water in the ground is the slowest and least expensive technique for recovering contaminated ground.

An obstacle to in-situ biological techniques for recovering contaminated ground has been supplying enough oxygen within the ground to encourage the chemical reactions needed to bring about the degradation of pollutants into non-toxic chemicals. Efforts have been made to force air into the ground, or to apply pure oxygen or oxygen-releasing chemicals into a contaminated area. Where the delivery of such oxygen is low compared to the amount of toxins in the contaminated ground, the clean up time can be prolonged. Also, existing methods of oxygenating ground are expensive and not always effective. For example, delivering gas or oil into the ground under too high a pressure will result in the formation of escape pathways which reduce the efficiency of the oxygen being applied to the ground.

BRIEF DESCRIPTION OF THE INVENTION

In accordance with the present invention, the oxygen in contaminated ground is increased by the oxygenation of the ground water. To oxygenate the ground water of a parcel of contaminated ground, a plurality of vertical wells are drilled into the ground, the wells being spaced sufficiently close to one another to oxygenate the intervening ground. Preferably, twenty to twenty-five feet should separate adjacent wells. Each well must extend below the water table and the deeper the well extends below the water table, the greater the area surrounding the well that can be oxygenated.

To oxygenate each well, an oxygenation unit is lowered therein. The oxygenation unit consists of a length of tubing having an upper and lower end with a tubular wall extending between them. Within the tubing is a plurality of parallel electrically conductive plates extending parallel to each other and parallel to the axis of the tubing. The plates are spaced from one another and an electrical potential is applied across adjacent plates such that electrolysis will break down water between the plates into the chemical components of $O_2$ and $H_2$. Water in the wells moves across the plates by means of a pump thereby allowing the water to absorb the $O_2$.

In the preferred embodiment, an air flow draft pump is provided, consisting of an inverted funnel having a frusto-conical portion with a large diameter lower end positioned immediately above the plates and a small diameter upper end positioned a short distance above the large diameter lower end and a vertical tube extending from the small diameter upper end. An above ground air compressor directs pressurized air through a flexible tubing which extends down the well and into the oxygenation unit with the distal end extending through the wall of the funnel with an outlet immediately above the plates.

Preferably, between five and twelve volts are applied across the plates to generate a current of between one and one half and four amps. The tube for the oxygenation unit is preferably positioned at the upper end of the well at least three feet below the ground water level for oxygenating an area of ground having a diameter of approximately six feet from the well. To oxygenate an area of fifteen to twenty feet from the well, the oxygenation unit should be positioned at least ten feet below the ground water level. The forced air from the pump is released above the plates and moves up through the tube at the upper end of the funnel and draws water with it, creating a draft to pull new water from adjacent ground into the well below.

The bubbles of air which are released at the upper end of the funnel tube create a frothing of water which rises above the level of the ground water. The greater the amount of compressed air pumped into the funnel, the higher the froth of water will rise above the ground water level thereby cresting a head of water extending higher than the existing water table. A perforated tubing is used to define the walls of the well and the froth of water which extends above the ground water level overflows into adjacent ground water and spills outward of the well in the form of an underground wave.

As a result of the injection of oxygen into the water of oxygen formed on the plates, the frothing water flowing into adjacent ground has an oxygen level of about twenty parts per million (ppm) which is sufficiently high to cause the degradation of hydrocarbons into non-toxic chemicals. As the water continues to flow outward, it settles downward into the ground water and gradually increases the oxygenation of the ground water surrounding the well. As the water moves away from the upper end of the well, the level of oxygen in the water falls off. After a period of time the distribution of oxygen between adjacent wells elevates and finally reaches a stable equilibrium. Where the oxygenation unit is positioned at least ten feet below the water level, the water within fifteen to twenty feet from the well will reach an oxygen concentration of one ppm within about ninety days after the oxygenation unit has been put into operation. The one ppm concentration of oxygen in the ground water is sufficient to support the growth of bacteria needed to needed to detoxify the ground. Hydroxyl radicals (2OH)—are strong oxidizer which contributes to the breakdown of toxic chemicals.

To control other contaminants, such as chlorine producting salts, a sock filled with activated carbon or an ion exchange material can be positioned within the tubing below the plates.

It should be appreciated that although it has been well known that oxygen in the ground water would stimulate bacteria, to the applicant's knowledge there have been no prior efforts to use hydrolysis to oxygenate ground water because all laboratory models have produced high levels of free chlorine which in turn inhibits bacteria growth. I have found that although significant amounts of free chlorine are formed, the chlorine does not significantly interfere with the bacterial growth. The applicant presumes this is because the chlorine weighs about one and a half times the weight of water and because the chlorine quickly combines with other substances. The chlorine actually provides a benefit because it prevents bacteria from forming in the immediate vacinity of the oxygenation units.

BRIEF DESCRIPTION OF THE DRAWINGS

A better and more complete understanding of the present invention will be had after a reading of the following detailed description taken in junction with the drawings wherein.

DETAILED DESCRIPTION OF THE PREFERRED EMBODIMENT

Figure 1:
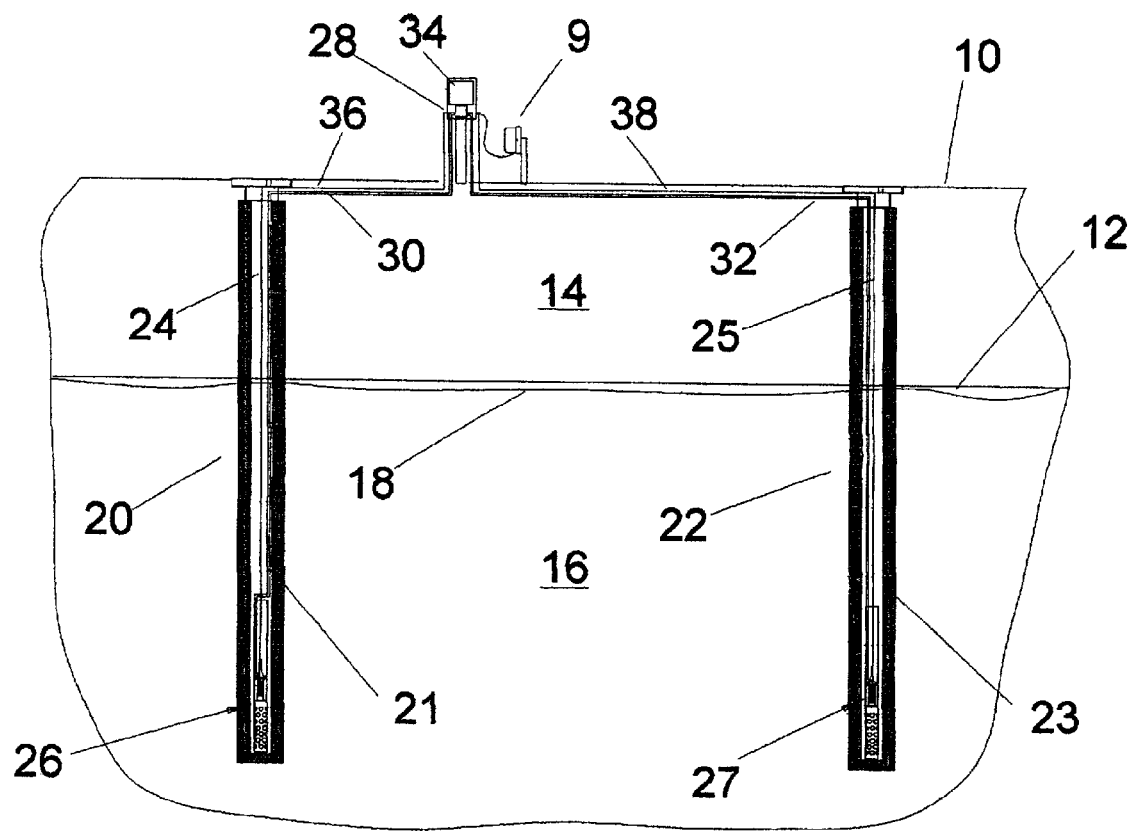
FIG. 1 is a cross sectional view of a parcel of ground having a plurality of wells therein fitted with oxygenation units in accordance with the present invention.

Referring to FIG. 1, a parcel of ground has a surface 10 and a ground water level 12. Above the ground water level 12 is unsaturated soil 14 and below the level 12 is saturated soil 16 containing a mixture of liquid hydrocarbon pollutants and water. A layer of pooled hydrocarbons 18, such as gasoline or oil, float on the surface of the ground water level 12.

In accordance with the invention, a plurality of cylindrical vertically oriented wells 20, 22, the walls of which are defined by porous tubular members 21, 23, such as a length of tubular piping with a plurality of transverse holes, not visible, therein for the circulation of ground water therethrough. Suspended by wires 24, 25 are oxygenation units 26, 27 in accordance with the present invention. Preferably, the oxygenation units are positioned with the upper ends thereof below the ground water level 12 and the deeper the oxygenation units 26, 27 are inserted into the wells 20, 22, the larger the area which ultimately can be oxygenated and detoxed.

Positioned above the ground level 10 is an air compressor 28 which directs pressurized air through tubes 30, 32 extending through the wells 20, 22 respectively to the oxygenation units 26, 27. Also above ground level is a source of electric power 34 which may include transformers, not shown, for reducing the voltage of commercially available AC power. Alternatively batteries may be provided depending on the economics of providing the required electric power. Wires 36, 38 extend from the power source 34 down the wells 20, 22 to the oxygenation units 26, 27.

Figure 2:
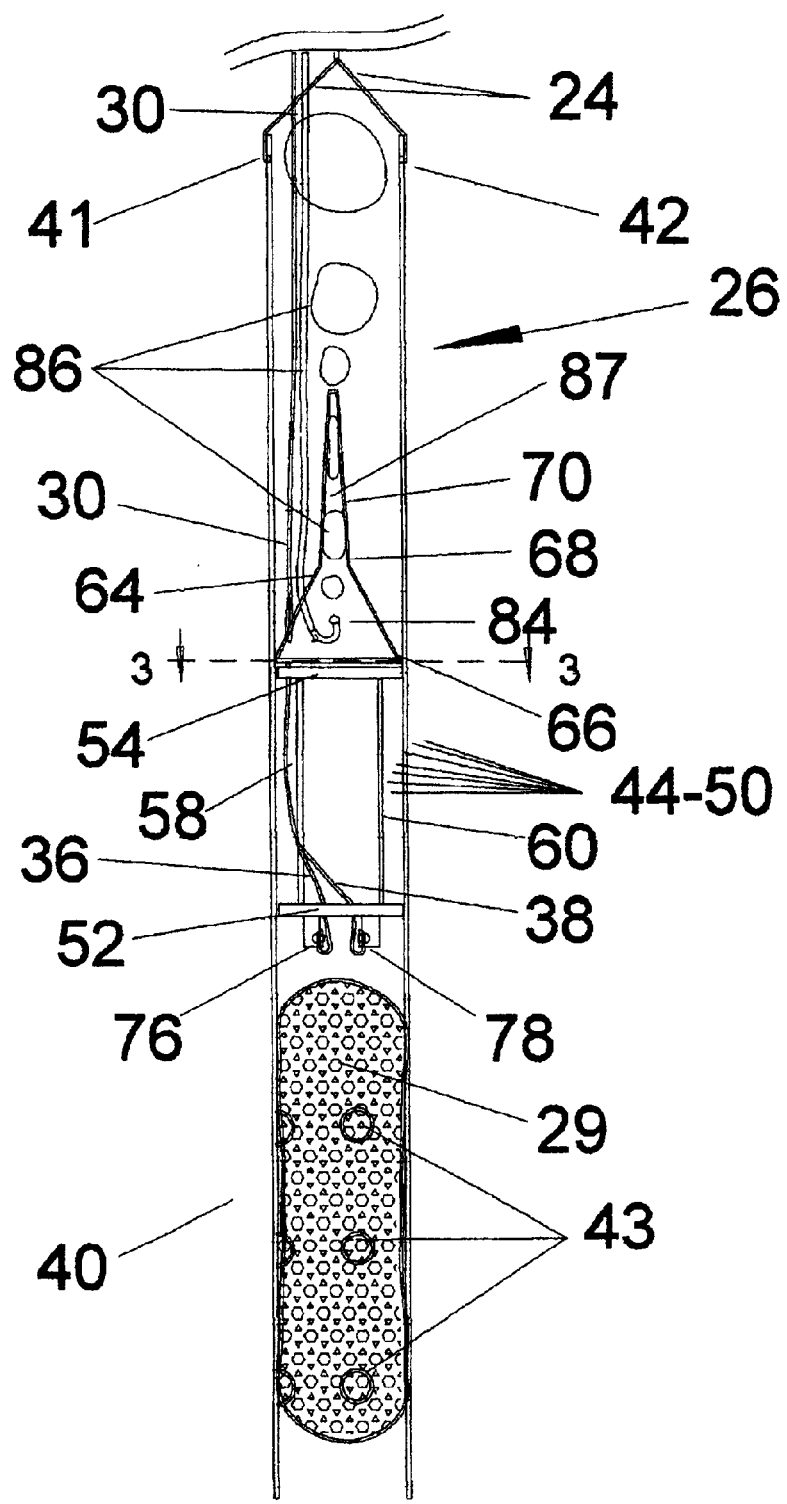
FIG. 2 is an enlarged cross sectional view of one of the oxygenation units shown in FIG. 1.
Figure 3:
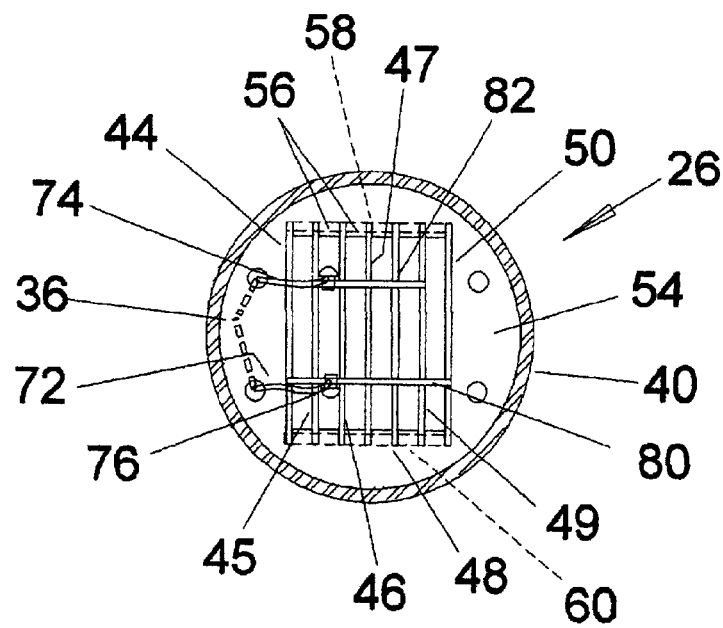
FIG. 3 is a further enlarged cross sectional view of the oxygenation units shown in FIG. 2 taken through line 3—3 thereof.
Figure 4:
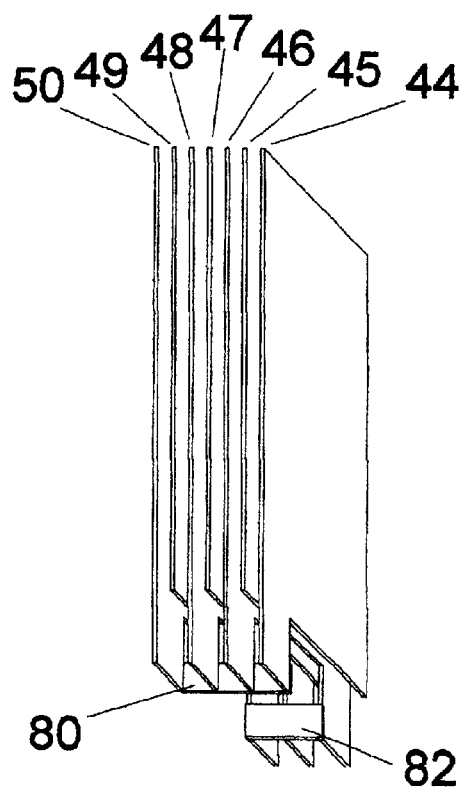
FIG. 4 is an isometric view of the plates for the oxygenation unit shown in FIG. 2.

Referring to FIGS. 2 through 4, in which the elements of one oxygenation unit 26 are representative of all, the unit 26 is enclosed in an elongate tubular member 40 which may be made out of any suitable material such as plastic. In the preferred embodiment, the tubular member 40 has an overall length of about three feet and a diameter of about three inches. At the upper end thereof are a pair of holes 41, 42 through which the support wire 24 extends for suspending the unit 26 at the desired depth below the water level 12. The lower end of the tubular member 40 may have a plurality of apertures 43 to allow water to freely enter the lower end of the thereof. Inserted into the lower end of the tubular member 40 is a flexible porous nylon sock 29 containing granulated activated carbon or an ion exchange material for removing various impurities, such as chloride producing salts.

Centrally located within the tubular member 40 is a plurality of vertically oriented parallel electrically conductive plates 44–50, which are retained in space relationship within the tubular member 40 by upper and lower insulated Jimson spacers 52, 54. The Jimson spacers 52, 54 have circular outer diameters equal to the inner diameter of tubular member 40 and forms a blockage between the outermost plates 44, 50 and the inner surface of the tubular member 40 such that all the water moving upward through the tubular member 40 must pass between two of the plates 44–50. As best seen in FIG. 3, in which spacer 52 is representative of both spacers 52, 54, the plates 44–50 are retain in spaced relationship by a plurality of fingers 56 which extend a short distance between adjacent plates. The plates have a thickness of about $\frac{1}{16}$ inch and the spacing between plates is about $\frac{3}{16}$ inch. A pair of nonconductive end members 58, 60 (visible in FIG. 2 and shown in broken lines in FIG. 3) abut the opposing vertical ends of the plates 44–50 and seal against the lower surface of the upper Jimson spacer 54 and the upper surface of the lower Jimson spacer 52 such that water moving from below the plates upward between them will move in a laminar flow and not circulate between the plates and the inner wall of the tubular member 40.

As best shown in FIGS. 3 and 4, the electrical cable 36 includes positive and negative wires 72, 74 respectively, with negative wire 72 attached by connector 76 to a shunt 80 which electrically connects together all the negatively charged plates 44, 46, 48, 50. Similarly, positive wire 74 is attached by connector 78 to a second shunt 82 which connects together all the positively charged plates 45, 47, and 49.

Positioned above the upper retainer 54 is an inverted funnel, having a generally frustoconical outer wall 64 with a large diameter lower end 66 which is equal to the inner diameter of the tubular member 40 and a considerably smaller diameter upper end 68. Extending upward from the small upper end 68 is a tubular draft pipe 70 which is preferably at least six inches in length and has a diameter of about ½ inch.

Like the cable 24, the air tube 30 extends through the frustoconical wall 64 of the funnel with the distal end 84 thereof positioned just above the upper ends of the plates 44–50. Accordingly, air from the compressor 28 will move through the tube 30 and be released above the plates 44–50. As the air is released from the distal end 84 of the tube 30, air bubbles 86 will be forced by gravity through the draft pipe 70. As the bubbles 86 move through the draft pipe 70 they expand as the water pressure drops. The surface tension of each bubble pushes a slug of water 87 through the draft pipe 70, thereby drawing water from the lower end 41 of the tubular member between the plates 44–50. It is the movement of the bubbles 86 forcing slugs of water 87 up the draft pipe 70 which creates the pumping action, and therefor the draft pipe 70 must have a sufficiently narrow diameter that the surface tension of the water can retain bubbles which extend across the diameter thereof. As electric potential is applied across the surfaces of the plates 44–50 and a current is passed through the water, the water is electrolyzed creating free hydrogen and oxygen gas bubbles. The oxygen then desolves into the water as it passes between the plates 44–50.

Figure 5:
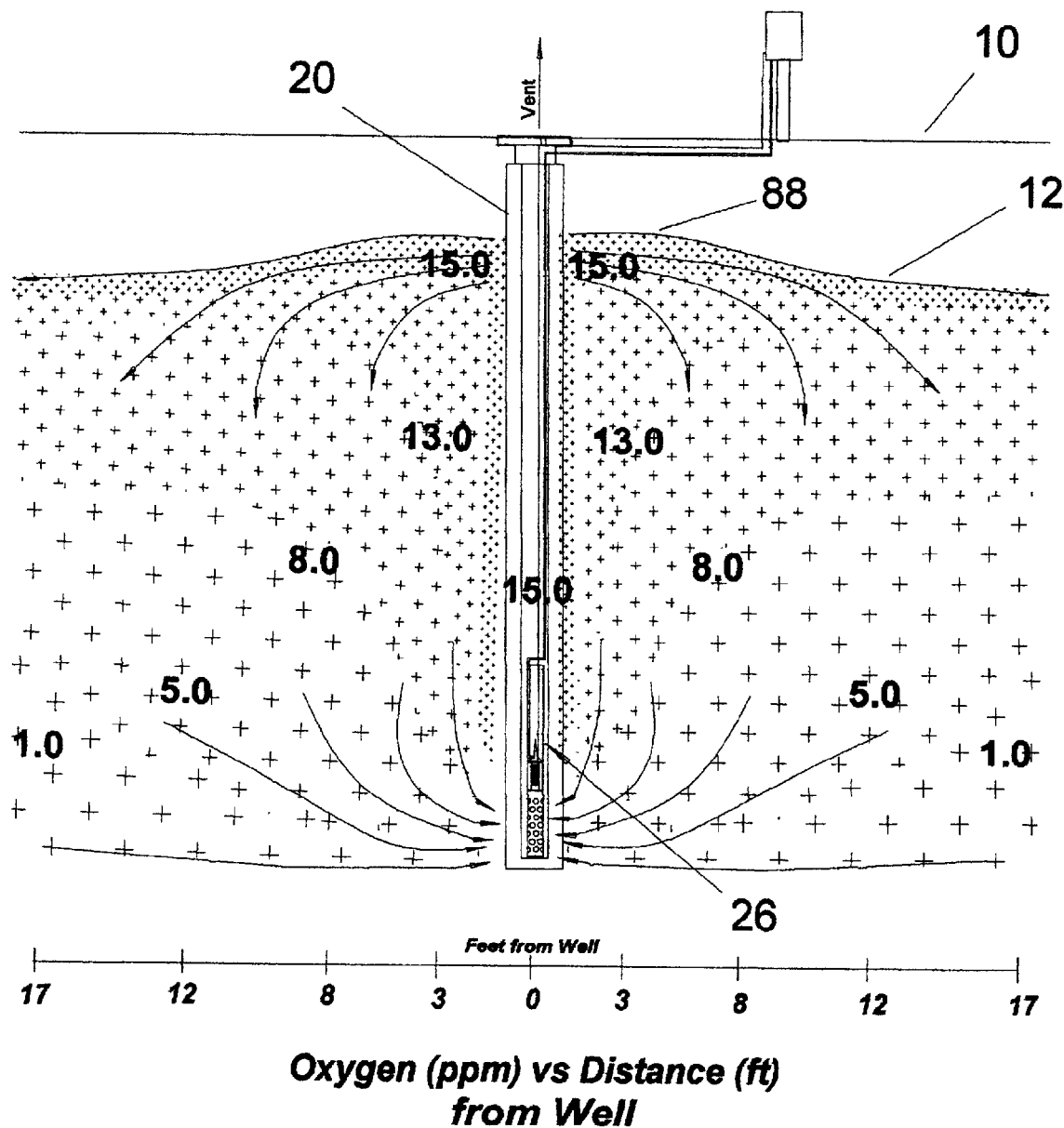
FIG. 5 is a cross sectional view of a parcel of ground being oxygenated in accordance with the invention.

Referring to FIG. 5, normally, ground water contains little or no dissolved oxygen which is required for bacteria to attack contaminating hydrocarbons. During the operation of the oxygenation unit 26, concentrated oxygen ($O_2$) is dissolved into the water and moves through the tubular member 40 and out the upper end. The pumping of water through the draft tube 70 results in a cresting or frothing of water 88 above the ground water level 12. The elevated water level of the frothing water flows in a wave outward of the well hole 20. Over a period of time, the oxygen level in the saturated soil 16 becomes elevated and eventually takes on the contour depicted.

The electrolysis process results in the formation of hydrogen $H_2$ molecules and oxygen $O_2$ molecules and the formation of hydrogen cations H+ and hydroxide anions (OH)-. Both the oxygen and the hydroxide anions contribute to the oxygenation of toxic chemicals, degrading them into non-toxic molecules.

As can be seen in FIG. 5, the oxygenation is concentrated in the near proximity to the well 20 where the level is depicted as between 15 ppm near the top and 13 ppm further down the length of the well. Outward of the well, the concentration of oxygen falls to 8 ppm and then to 5 ppm. In the area of highest concentration, the hydroxide anions will bring about the degradation of hydrocarbon pollutants into non-toxic forms. Further outward, the concentration of oxygen of 1.0 ppm or higher will support the bacteria needed to biologically bring about the degradation of toxic hydrocarbons.

The pump will draw loose particles from the well into the tubular member 40 where they can become trapped in the sock or collect on the plates or the connecting cables. Daily checks should be made of each unit 26 to see that the plates and cable connections are free of debris and to change the filter sock when needed. Inspections can be made less frequently depending on the characteristics of the well.

EXAMPLE

A test site was chosen in Wayne, Ill. which was a gasoline station in the 1950's and 1960's. Accumulated petroleum products had been left in the soil rendering the property unusable. The silty clay ground, typical of the area, has an affinity to holding gasoline and retained the plume of affected soil to under the site. Ground water flowed Northeast across the site at a rate of $10^{-5}$ feet per day, and the affected area covered 1200 cubic yards.

As shown in FIGS. 6 to 10, one 4 inch oxygenation well identified as "$O_2$ Tube" was drilled to 25 feet and three 2 inch 15 foot deep test wells S1, S2, S3 were positioned around the $O_2$ tube in the configuration depicted in the drawings. A preexisting 15 foot deep 4 inch well was used to provide background information. The water table was about 13 feet. Samples were tested using a Dtech BTEX test kit and a Cole Parmer bacterial growth test kit. Samples were also sent to the First Environmental test lab in West Chicago, Ill. to verify the Dtech results. The results of the initial test are shown in table 1.

TABLE 1

| Sample | Dtech BTEX Test | Cole Parmer Bacterial Test Kit | First Environmental Laboratory |
| --- | --- | --- | --- |
| $O_2$ Tube | 8 ppm | $10^5$ bacteria/gm | Benzene 8.9 ug/L, toluene 1980 ug/L, ethyl benzene 17.3 ug/L and xylene 13,300 ug/L (15.3 ppm total BTEX) |
| S1 | 6 ppm | $10^2$ | |
| S2 | 2 ppm | $10^3$ | |
| S3 | 10 ppm | $10^4$ | |

The oxygenation unit 26 was suspended in the $O_2$ well ($O_2$ tube) with the upper end of the unit about ten feet below the water table. When originally installed, the connectors 76, 78 and the shunts 80, 82 of the unit 26 were positioned above the plates 44–50 and were subject to such rapid erosion from the highly oxygenated water rising from the plates which rendered the device inoperable within a very short time. The unit 26 was redesigned between the 1st day and the $22^{nd}$ day into the configuration shown in the drawings and described above, and therefore, meaningful testing actually began on the $22^{nd}$ day after which the unit 26 operated without any serious corrosion problems. The tests continued for the next 93 days to day 115.

Referring to FIGS. 6 to 10, the approximate contour lines for the plum of oxygenated water from the $22^{nd}$ day to the $107^{th}$ day is depicted in FIGS. 6 to 10. Contour line 100 depict the approximate contour of 1 part per million of dissolved oxygen and contour line 120 depicts the approximate contour line for 2 parts per million of dissolved oxygen.

Figure 6:
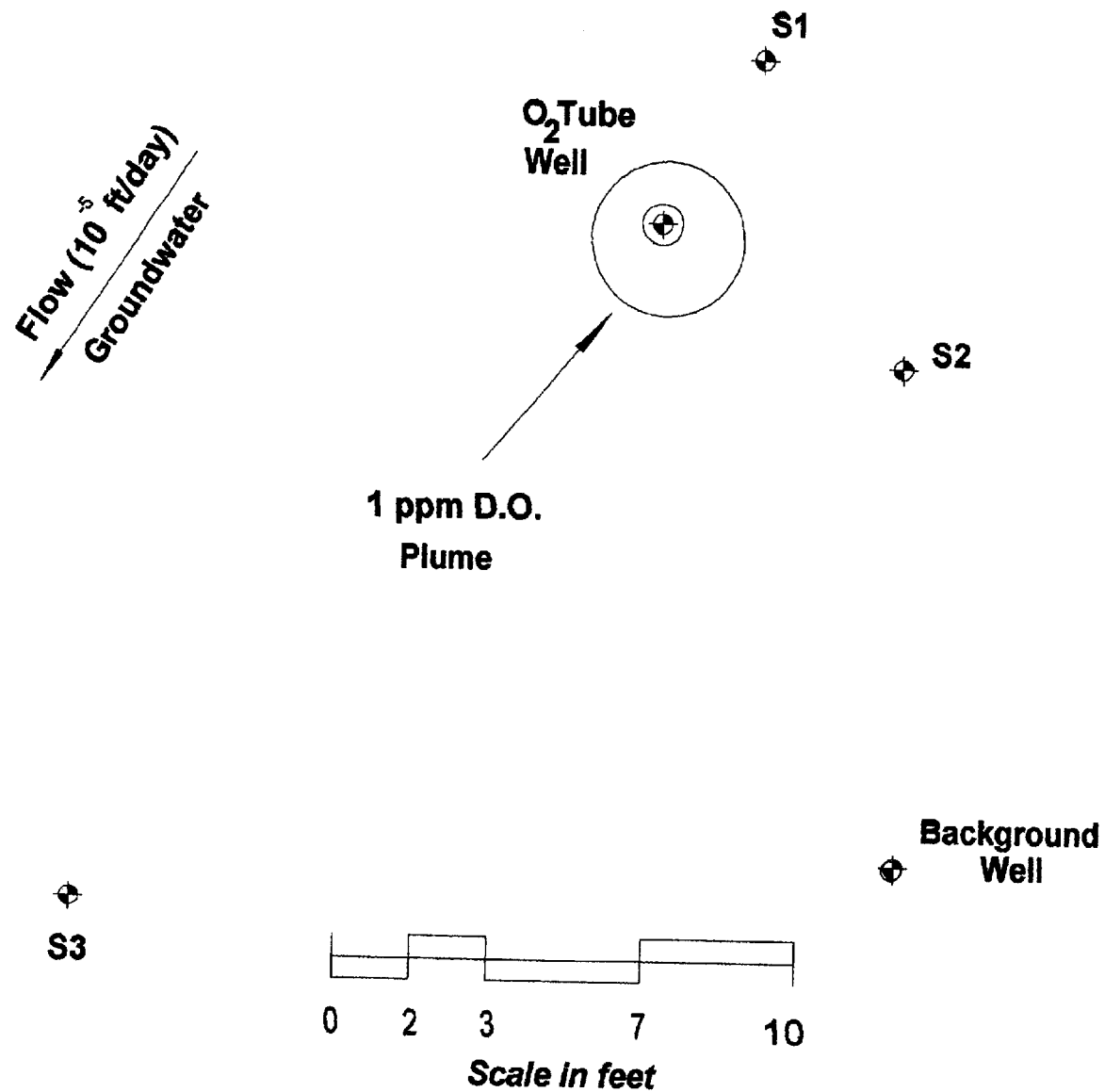
FIG. 6 is a schematic drawing a test cite showing the size of the plume of oxygenated water on the $22^{nd}$ day.

Table 2 sets forth these readings on the $22^{nd}$ day, the effective start date for the test, at which time the plume had the contour shown in FIG. 6. On inspection the unit 26 appear clean. volt/amp=5.5/2.0

TABLE 2

| Well | Dissolved $O_2$ | Temp. F. | Available Cl | Ph | Bacteria count per ml | BTEX ppm |
|---|---|---|---|---|---|---|
| $O_2$ Tube | 10.1 | 55.2 | 1 | 7.9 | $10^3$ | |
| S1 | 1.2 | 55.2 | <0.5 | 6.8 | $10^4$ | |
| S2 | 0.9 | 55.3 | <0.5 | 6.8 | $10^7$ | |
| S3 | 0.6 | 55.1 | <0.5 | 6.8 | $10^6$ | |
| Other Well | 0.7 | 55.4 | <0.5 | 6.8 | $10^5$ | |

Figure 7:
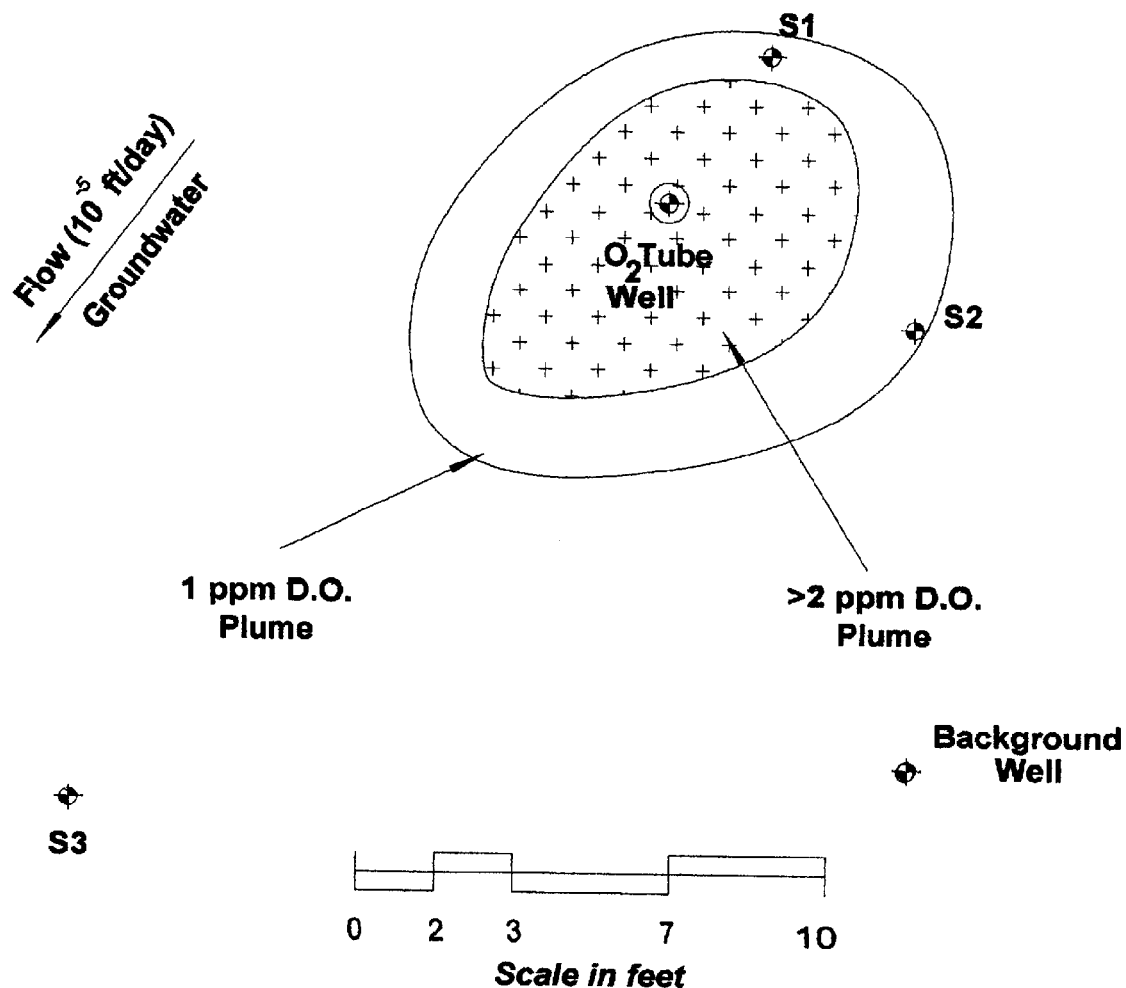
FIG. 7 is a schematic drawing of the plume on the test site shown in FIG. 6 on the 28th day.

By the $28^{th}$ day the plume had the contour shown in FIG. 7, the readings for which are set forth in table 3. The unit 26 appeared clean. The $O_2$ tube had a slight chlorine odor while the other wells had a petroleum odor. Volts/amps=6.1/2.0

TABLE 3

| Well | Dissolved $O_2$ | Temp. F. | Available Cl | Ph | Bacteria count per ml | BTEX ppm |
|---|---|---|---|---|---|---|
| $O_2$ Tube | 16.6 | 54.7 | 2.2 | 8 | | |
| S1 | 1.9 | 54.9 | <0.5 | 6.8 | | |
| S2 | 2.1 | 56.7 | <0.5 | 6.8 | | |
| S3 | 2 | 54.9 | <0.5 | 6.8 | | |
| Other Well | 1.7 | 57.5 | <0.5 | 6.8 | | |

Figure 8:
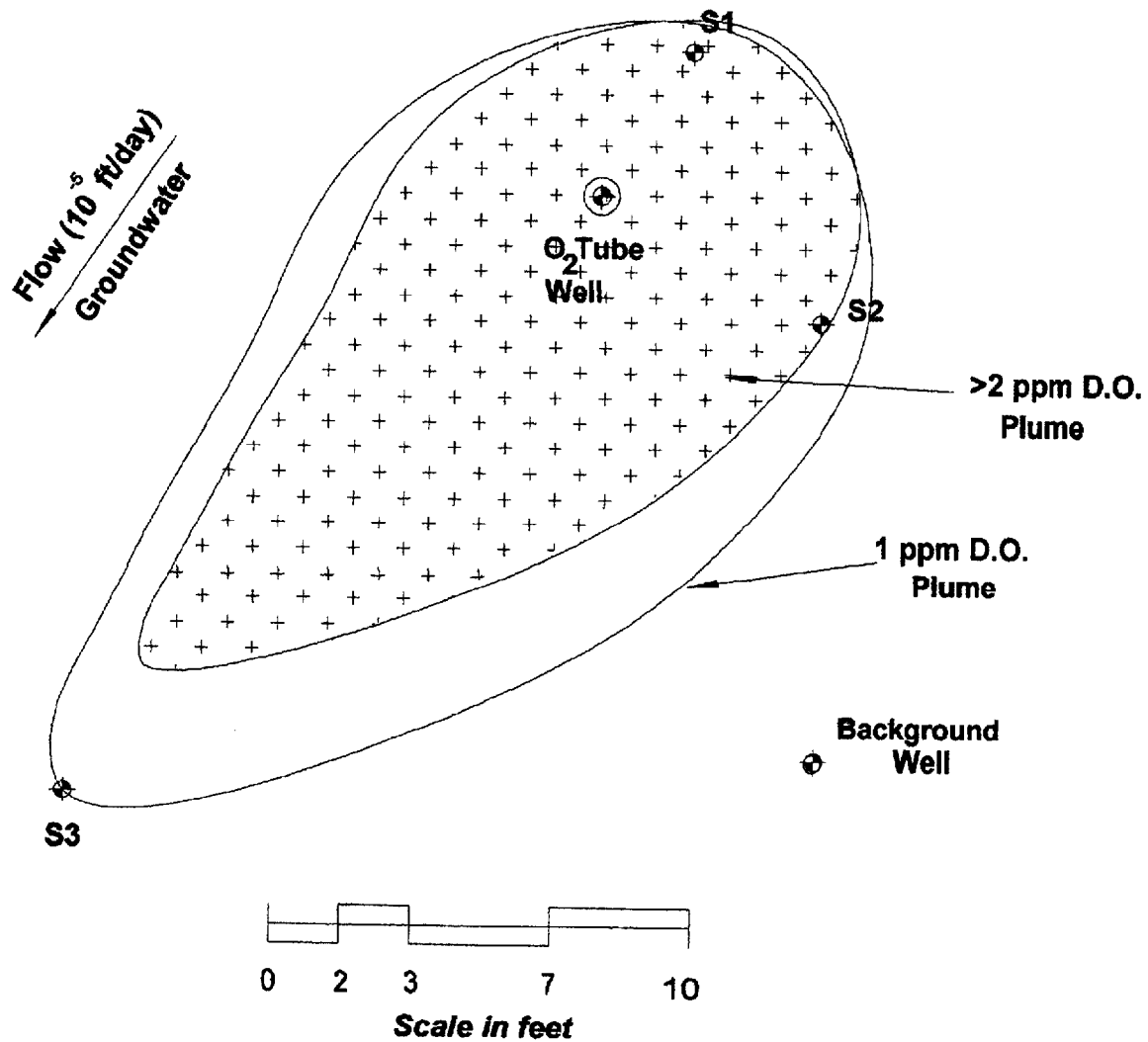
FIG. 8 is a schematic drawing of the plume on the test site shown in FIG. 6 on the 45th day.

By the $45^{th}$ day the plume was as shown in FIG. 8 and the readings where as set forth in table 4. The unit 26 had a white coating on its surface, probably calcium. The plates were coated with a black material, but cleaned with white vinegar. The $O_2$ tube had a clean smell, S1 and S2 had a gas odor and S3 had a strong petroleum odor. The background well had a slight odor. Volts/amps=9.5/2.0

TABLE 4

| Well | Dissolved $O_2$ | Temp. F. | Available Cl | Ph | Bacteria count per ml | BTEX ppm |
|---|---|---|---|---|---|---|
| $O_2$ Tube | 15.7 | 55.2 | 2 | 8 | | |
| S1 | 1.4 | 55.8 | <0.5 | 6.8 | | |
| S2 | 2.2 | 56.1 | <0.5 | 6.8 | | |
| S3 | 1.6 | 56.7 | <0.5 | 6.8 | | |
| Other Well | 0.7 | 58.6 | <0.5 | 7 | | |

Figure 9:
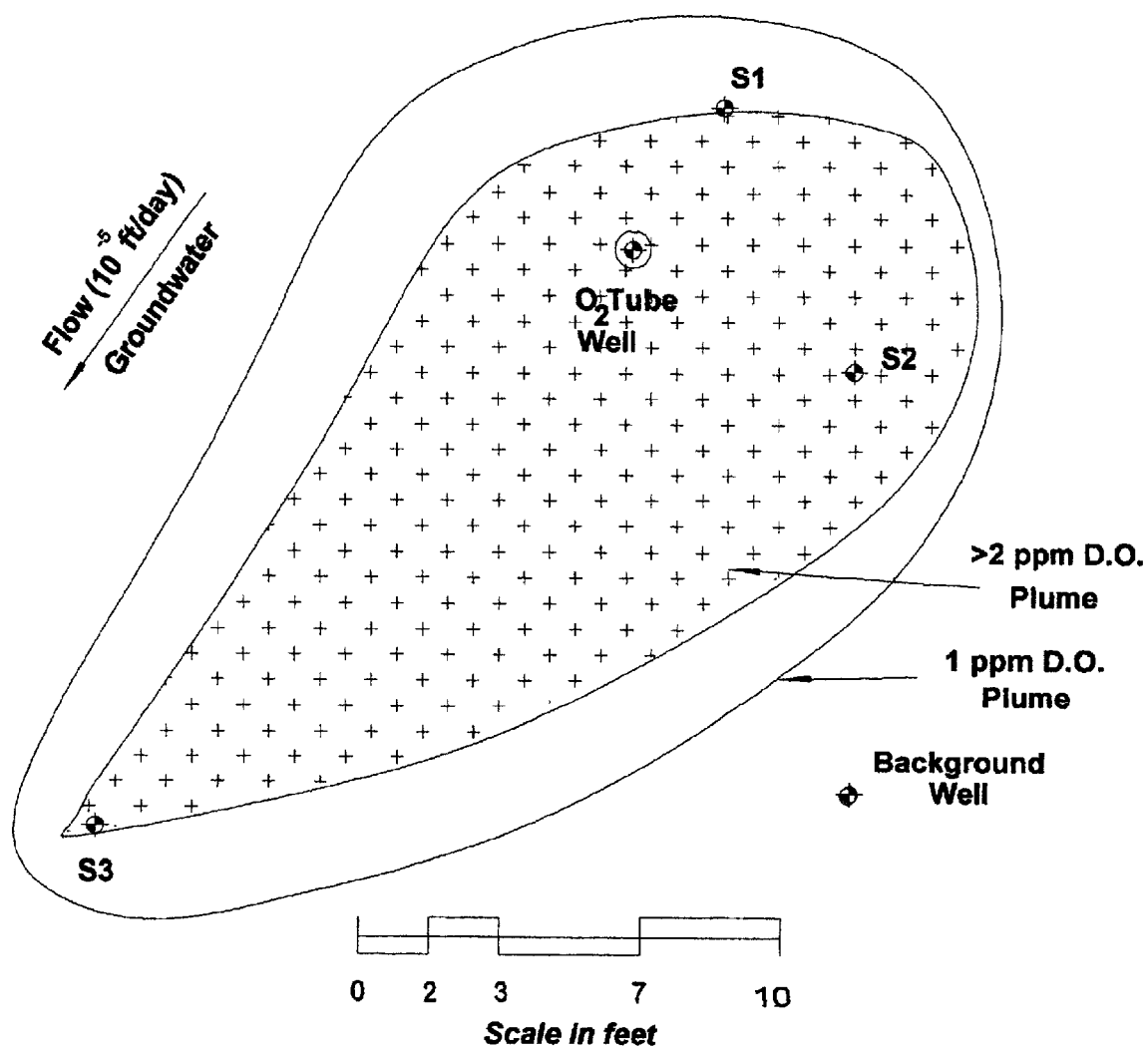
FIG. 9 is a schematic drawing of the plume on the test site shown in FIG. 6 on the 66th day.

By the $66^{th}$ day the plume was as shown in FIG. 9 and the readings where as set forth in table 5. The unit 26 appeared to be coated with calcium and was cleaned with vinegar/balloon method. The Referring further to FIGS. 6 to 10, the approximate contour lines for the plum of oxygenated water from the $22^{nd}$ day to the $107^{th}$ day is depicted in FIGS. 6–10. Contour line 100 depict the approximate contour of 1 part per million of dissolved oxygen and contour line 120 depicts the approximate contour line for 2 parts per million of dissolved oxygen. The $O_2$ tube and S2 smelled clean, S1 had a slight xylene odor, and S3 and the background well had a free product sheen and odor. Volt/amp=9.8/0.5

TABLE 5

| Well | Dissolved $O_2$ | Temp. F. | Available Cl | Ph | Bacteria count per ml | BTEX ppm |
|---|---|---|---|---|---|---|
| $O_2$ Tube | 17.4 | 56.5 | 1 | 8 | $10^5$ | |
| S1 | 1.9 | 57.9 | <0.5 | 6.8 | $10^7$ | |

TABLE 5-continued

| Well | Dissolved $O_2$ | Temp. F. | Available Cl | Ph | Bacteria count per ml | BTEX ppm |
|---|---|---|---|---|---|---|
| S2 | 3.8 | 65.3 | <0.5 | 6.8 | $10^7$ | |
| S3 | 1.9 | 59.5 | <0.5 | 6.8 | $10^7$ | |
| Other Well | 1.4 | 61.3 | <0.5 | 6.8 | $10^5$ | |

Figure 10:
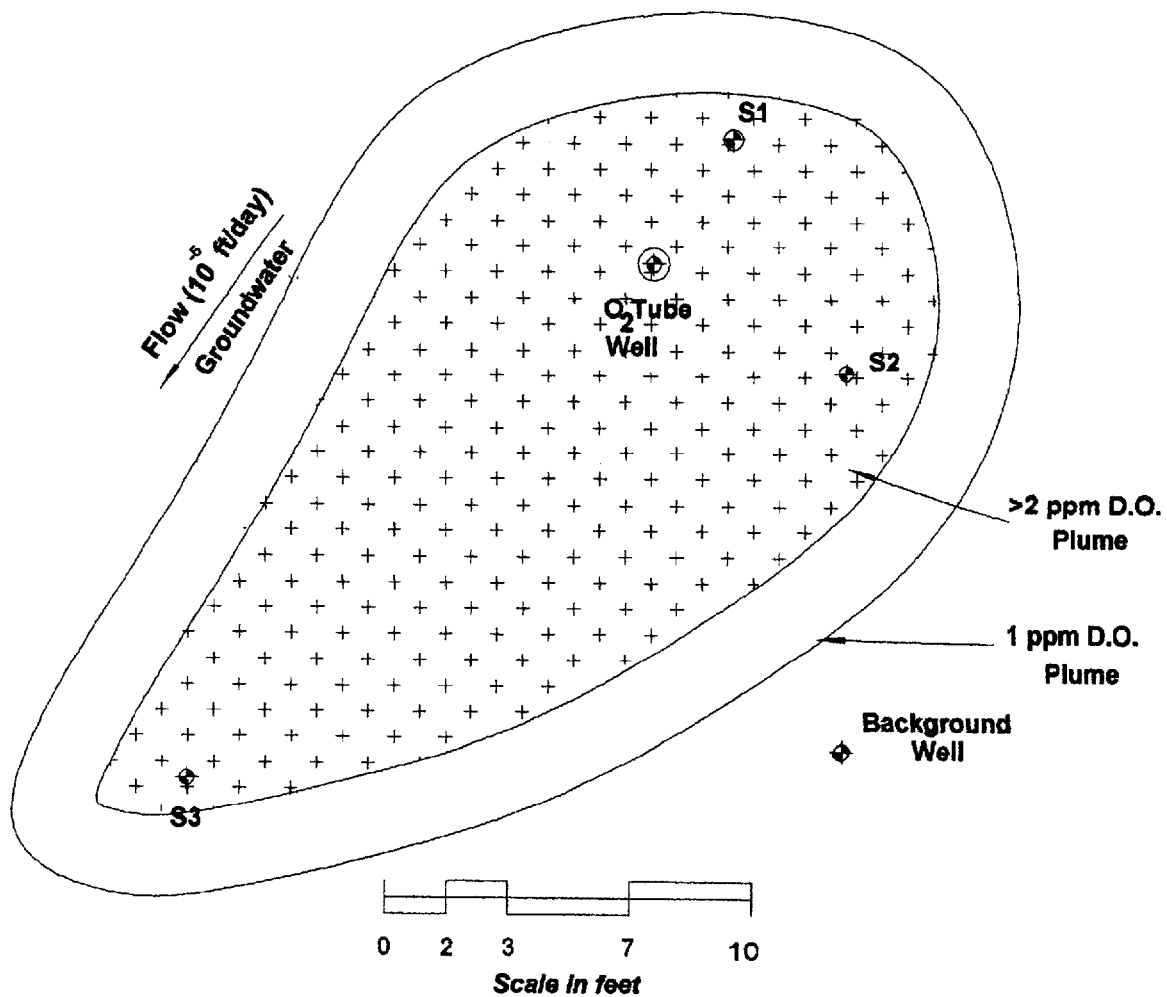
FIG. 10 is a schematic drawing of the plume on the test site shown in FIG. 6 on the 107th day.

On the $107^{th}$ day the plume was as shown in FIG. 10 and the readings were as shown in table 6. The unit 26 appeared coated and there was some corrosion around the anode. The $O_2$ tube had no odor, S1 had a rotten fish odor, S2 had a fishy odor, S3 had a slight petroleum odor, and the background well has a gas odor, sheen and was silty. Volt/amp=7.5/1.5.

TABLE 6

| Well | Dissolved $O_2$ | Temp. F. | Available Cl | Ph | Bacteria count per ml | BTEX ppm |
|---|---|---|---|---|---|---|
| $O_2$ Tube | 12.6 | 57.4 | 2 | 8 | $10^2$ | <0.6 |
| S1 | 2.3 | 57.6 | <0.5 | 6.8 | $10^7$ | 1 |
| S2 | 2.2 | 59.4 | <0.5 | 6.8 | $10^7$ | 0.6 |
| S3 | 2.5 | 58.6 | <0.5 | 6.8 | $10^6$ | 2 |
| Other Well | 0.8 | 62.8 | <0.5 | 6.8 | $10^4$ | Free prod. |

On the $115^{th}$ day the unit 26 was coated with calcium and there was some corrosion around the anode connector. The unit 26 was cleaned with white vinegar for about 45 minutes after which the coating was completely removed. The $O_2$ tube had no odor although it appeared cloudy, S1 had a rotten fish odor and was slightly cloudy, S2 had a fishy odor and was clear, S3 had a slight petroleum odor and was clear. Volts/amps=9.0/0.75 before cleaning the unit 26 and 6.0/1.5 after cleaning. The final readings are set forth in table 7 in which all test wells show concentrations of about 2.0, which will readily support the bacteria needed to degrade the contaminates.

TABLE 7

| Well | Dissolved $O_2$ | Temp. F. | Available Cl | Ph | Bacteria count per ml | BTEX ppm |
|---|---|---|---|---|---|---|
| $O_2$ Tube | 12.8 | 58.1 | <0.5 | 8 | | |
| S1 | 2.5 | 59 | <0.5 | 6.8 | | |
| S2 | 1.9 | 60 | <0.5 | 6.8 | | |
| S3 | 2.2 | 61.2 | <0.5 | 6.8 | | |
| Other Well | 1.7 | 61.2 | <0.5 | 6.8 | | |

While the present invention has been described with respect to a single embodiment, it will be appreciated that there are many modifications and variations, which fall within the true spirit and scope of the invention. It is, therefore, the intent of the following claims to cover all such modifications and variations that fall within the true spirit and scope of the invention.

What is claimed is:

1. A device for oxygenating ground water comprising
   a length of tubing having an open upper end, an open lower end, a tubular wall extending from said upper end to said lower end, and a longitudinal axis,
   a plurality of parallel electrically conductive plates within said tubular wall,
   said plurality of plates having a spacing between adjacent ones thereof, means for applying and electric potential across adjacent pairs of said plates and across said spacings, a pump for moving water through said tubing from said lower end to said upper end, said pump including an inverted funnel having a frustoconical portion with a large diameter lower end and a smaller diameter upper end, and a tubular draft pine extending upwardly from said smaller diameter upper end, and means for vertically suspending said tubing within said vertical well.

2. The device of claim 1 and further comprising a filter in said open lower end of said length of tubing.

3. The device of claim 2 wherein said filter contains granulated activated carbon.

4. The device of claim 2 wherein said filter contains ion exchange material.

5. The device of claim 1 and further comprising means for directing all upwardly moving water in said tubing between said plurality of plates.

6. The device of claim 5 wherein said plurality of plates include two outermost plates and said device further comprises, a first Jimson spacer at an upper end of said plurality of plates, a second Jimson spacer at a lower end of said plates, and said means for upwardly moving water between said plurality of plates includes sealing said outermost plates against said first and second Jimson spacers.

7. The device of claim 5 wherein each of said plurality of plates has a first and a second opposing vertical ends and said device further comprises, a first planar end member abutting said first vertical ends of said plurality of plates, and a second end member abutting said second vertical ends of said plurality of plates.

8. The device of claim 1 wherein said inverted funnel is positioned in said tubing above said plates.

9. The device of claim 1 wherein said pump further comprises a compressor for compressing air, and a tube extending from said compressor to a position within said tubing and under said inverted funnel.

10. The device of claim 9 wherein said inverted funnel is positioned in said tubing above said plates and said tube extending from said compressor has a distal end positioned above said plates.

11. The device of claim 9 wherein said plates extend parallel to said longitudinal axis.

12. A device for oxygenating ground water comprising a well extending into the ground to a level below the water table, a length of tubing having an open upper end, an open lower end, a tubular wall extending from said upper end to said lower end, and a longitudinal axis, a plurality of parallel electrically conductive plates within said tubular wall, said length of tubing suspended in said well, said plates having a spacing between adjacent ones thereof, means for applying and electric potential across adjacent pairs of said plates and across said spacings, a pump for moving water through said tubing from said lower end to said upper end and said pump including an inverted funnel having a large diameter lower end and a smaller diameter upper end.

13. The device of claim 12 wherein said inverted funnel has a frustoconical portion extending from said large diameter lower end to said smaller diameter upper end, and a tubular draft pipe extending upwardly from said smaller diameter upper end.

14. The device of claim 13 wherein said inverted funnel is positioned in said tubing above said plates.

15. The device of claim 13 wherein said pump further comprises a compressor for compressing air, and a tube extending from said compressor to a position within said tubing and under said inverted funnel.

16. The device of claim 15 wherein said inverted funnel is positioned in said tubing above said plates and said tube extending from said compressor has a distal end positioned above said plates.

17. The device of claim 16 wherein said plates extend parallel to said longitudinal axis.

18. The device of claim 12 and further comprising means for directing all water moving through said tubing between said plurality of plates.

19. The device of claim 18 wherein said plurality of plates include two outermost plates and said device further comprises, a first Jimson spacer at an upper end of said plurality of plates, a second Jimson spacer a lower end of said plates, and said means for directing water moving through said tubing between said plurality of plates includes sealing said outermost plates against said first and second Jimson spacers.

20. The device of claim 18 wherein each of said plurality of plates has a first and a second opposing vertical ends and said device further comprises, a first planar end member abutting said first vertical ends of said plurality of plates, and a second end member abutting said second vertical ends of said plurality of plates.

21. The method of oxygenating ground water under a parcel of ground comprising the steps of providing a plurality of wells in said ground where each well extends below said ground water level, providing a plurality of oxygenation units where each oxygenation unit comprises a length of tubing having an open upper end, an open lower end, a tubular wall extending from said open upper end to said open lower end, and a longitudinal axis, a plurality of parallel electrically conductive plates within said tubular wall, said plates having a spacing between adjacent ones thereof, means for applying and electric potential across adjacent pairs of said plates and across said spacings, a pump for moving water through said length of tubing from said lower end to said upper end, wherein said pump comprises an inverted funnel having a frustoconical portion with a large diameter lower end and a smaller diameter upper end, and a tubular draft pipe extending upwardly from said smaller diameter upper end, and said method further comprises, providing an air compressor having an output, providing a plurality of lengths of tubing, extending said length of tubing from said compressor output to said funnels of said oxygenation units, and suspending one of said oxygenation units in each of said wells.

22. The method of claim 21 wherein said upper end of said tubing of said oxygenation unit is positioned below said ground water level.

23. The method of claim 21 wherein said wells have a spacing apart from one another of 20 to 24 feet.

24. A device for oxygenating ground water comprising a length of tubing having an open upper end, an open lower end, a tubular wall extending from said upper end to said lower end, and a longitudinal axis, a plurality of electrically conductive plates within said tubular wall, said plurality of plates having a spacing between adjacent ones thereof, means for applying an electric potential across adjacent pairs of said plates and across said spacings, a pump for moving water through said tubing from said lower end to said upper end, said pump including an inverted funnel having a large diameter lower end and a smaller diameter upper end, and means for vertically suspending said tubing within said vertical well.

* * * * *

UNITED STATES PATENT AND TRADEMARK OFFICE
CERTIFICATE OF CORRECTION

PATENT NO.   : 6,758,959 B2
DATED        : July 6, 2004
INVENTOR(S)  : Jerry Kellgren It is certified that error appears in the above-identified patent and that said Letters Patent is hereby corrected as shown below:

Column 3,
Line 47, after "drawing" insert -- of --.

Column 7,
Line 50, after "method" delete "The".

Column 9,
Line 28, after "for" insert -- directing --.

Signed and Sealed this

Twenty-eighth Day of June, 2005

JON W. DUDAS
*Director of the United States Patent and Trademark Office*